READILY INTEGRABLE COLOR OSCILLATOR CIRCUIT
Filed Nov. 7, 1966
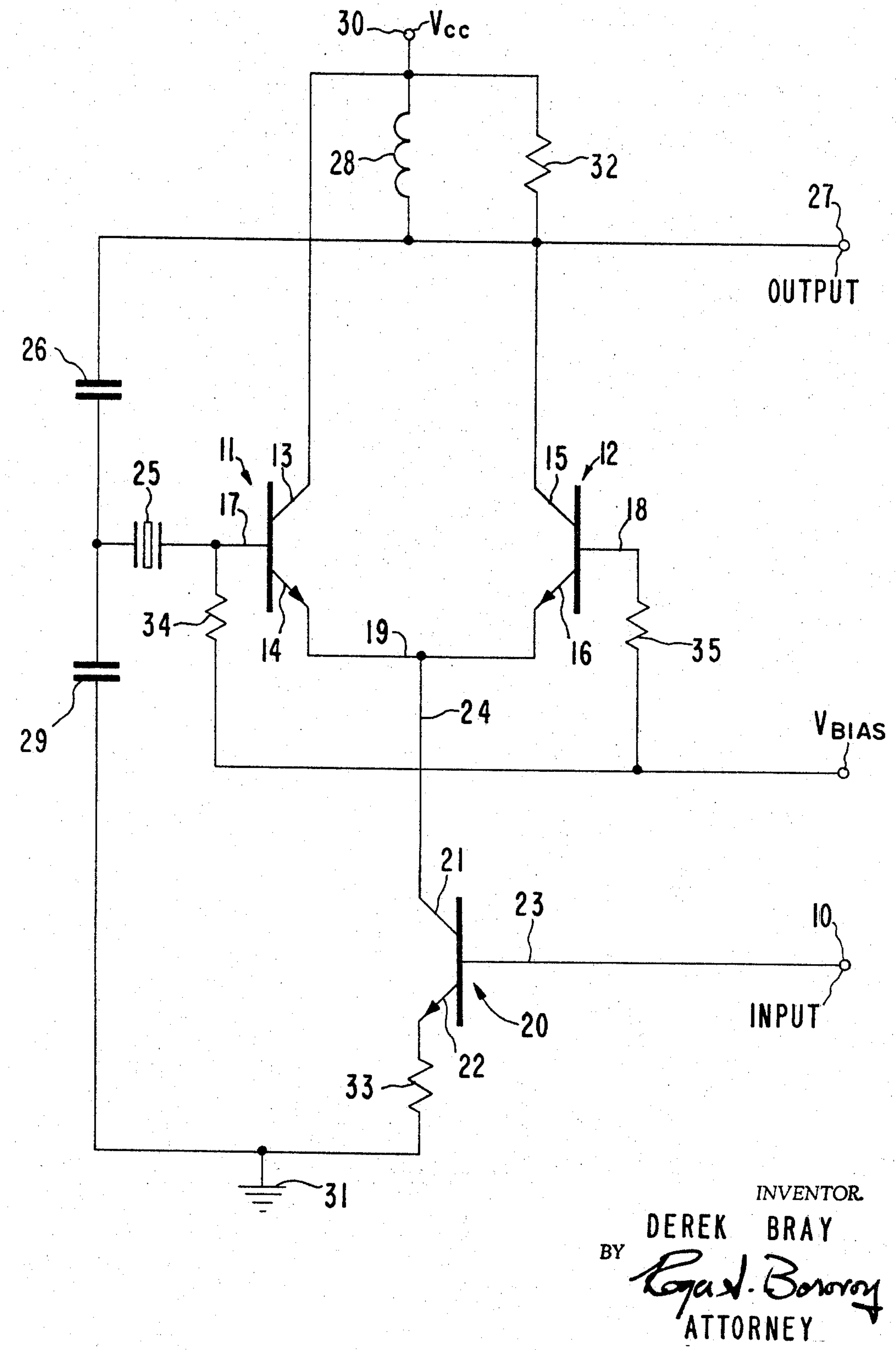
INVENTOR
DEREK BRAY
BY [signature]
ATTORNEY 3,378,790
READILY INTEGRABLE COLOR OSCILLATOR CIRCUIT
Derek Bray, Los Altos, Calif., assignor to Fairchild Camera and Instrument Corporation, Syosset, N.Y., a corporation of Delaware
Filed Nov. 7, 1966, Ser. No. 592,498
9 Claims. (Cl. 331—116)

ABSTRACT OF THE DISCLOSURE

A circuit for coupling the burst signal in a television receiver to the crystal and for providing feedback of a portion of the crystal oscillator's output to the crystal, using a pair of coupled solid state signal-handling devices. A third solid state signal-handling device, such as a transistor, is connected as a current source to the coupled pair of devices. A frequency-determining circuit is coupled to this control electrode of the third device for setting the frequency of oscillation of the oscillator circuit substantially at the given frequency.

The subject invention relates to an oscillator circuit for color processing in a color television receiver. More specifically, the invention covers an oscillator circuit for generating a signal having a given frequency and a phase determined by the phase of an input reference signal to the oscillator.

In a conventional NTSC-transmitted color television signal, a 3.5 mHz. color burst signal of approximately 8 cycles in length is transmitted for a short time between the horizontal scanning lines. It is transmitted immediately after the horizontal sync pulse. The beams are all turned off at that time (during retrace) so that there is no effect seen upon the screen. Because of its location following the horizontal sync pulse, it is often said that the color burst is on the "back porch" of the sync pulse.

In a television receiver, the output of a 3.58 mHz. crystal oscillator is employed as a reference signal for demodulation of the 3.58 mHz. color subcarrier component. In order to achieve correct demodulation, the oscillator has to be phase-locked to the incoming burst signal. One way of achieving this phase-lock is to employ an injection-locked oscillator well known in the art.

In conventional vacuum tube circuitry for accomplishing the above, the amplified burst signal is transformer-coupled directly to the crystal. This method of transformer-coupling the burst signal to the crystal has carried over into prior art transistor circuits where burst transformers are still employed for the purpose. This invention provides a new technique for coupling the burst signal to the crystal, and for providing the necessary feedback of a portion of the crystal oscillator's output to the crystal without the need for a burst transformer.

Briefly, the oscillator circuit for generating a signal having a given frequency and a phase determined by the phase of an input reference signal to the oscillator comprises: a pair of solid-state signal-handling devices each having a pair of current-conducting electrodes and a control electrode; a means coupling a first of the pair of current-conducting electrodes of one of the devices to the corresponding first one of the current-conducting electrodes of the other device; a solid-state signal-handling device connected as a current source having two current-conducting electrodes and a control electrode for controlling the current output from the source, the control electrode being adapted for being coupled to a reference signal having a given substantially constant frequency and phase; a means for coupling one of the current-conducting electrodes of the current source to the coupled electrodes of the pair of signal-handling devices; and a frequency determining circuit means coupling the control electrode of one of the pair of signal-handling devices to the second of the pair of electrodes of the other of the signal handling devices for setting the frequency of oscillation of the oscillator circuit substantially at he given frequency, whereby an output signal of the given frequency and phase determined by the phase of the reference signal is derived at the second of the pair of electrodes of the other one of the signal-handling devices.

The operation of the oscillator circuit of this invention will be better understood from the more detailed description which follows, making reference to the drawing in which the single figure is a circuit diagram of the oscillator circuit of a preferred embodiment of the invention.

The input reference signal, commonly from a color burst amplifier, is fed to input terminal 10. This signal, about 8 cycles in length, has a given substantially constant frequency and a phase set by the television station. The burst signal is repeated at the horizontal scan rate.

A pair of solid-state signal-handling devices 11 and 12 each have a pair of current conducting electrodes 13, 14, and 15, 16, respectively, and control electrodes 17 and 18, respectively. In the preferred embodiment of the invention, these solid-state signal-handling devices are transistors, specifically in the example these are NPN transistors. With proper bias changes, PNP transistors may be used. The current-conducting electrodes of transistor 11 are the collector and emitter electrodes 13 and 14 respectively; the current-conducting electrodes of transistor 12 are the collector and emitter electrodes 15 and 16, respectively. The control electrode of transistors 11 and 12 are the base electrodes 17 and 18, respectively.

Although transistors are illustrated, other well known solid-state signal-handling devices may be employed, for example conventional field-effect devices. These may either be insulated-gate field-effect transistors, or junction field-effect transistors, both being three-terminal devices well known in the art having a pair of current-conducting electrodes (the source and drain electrodes) and a control electrode (the gate electrode).

A means, such as line 19, couples a first of the pair of current-conducting electrodes of transistor 11 (emitter electrode 14 in the illustrated embodiment) to the corresponding first current-conducting electrode of transistor 12 (emitter electrode 16 in the illustrated embodiment). Although performance may be impaired by so doing, it is possible to use the collectors 13 and 15 as the coupled electrodes instead of the emitter electrodes 14 and 16.

Solid-state signal-handling device 20 is connected as a current source having two current-conducting electrodes 21 and 22 (the collector and emitter electrodes, respectively, in the illustrated embodiment) and a control electrode 23 (the base electrode in the illustrated embodiment). Again, a field-effect transistor may be substituted for the bipolar transistor 20, in which case the current-conducting electrodes 21 and 22 are the drain and the source electrodes, respectively, and the control electrode 23 is the gate electrode. Control electrode 23 controls the current output from the current source transistor 20. This control electrode is adapted for being coupled to the reference burst signal at input 10 having a given substantially constant frequency and phase. Resistor 33 is a conventional current-limiting resistor and is part of the current source including transistor 20.

Line 24 is a means coupling one of the current-conducting electrodes, namely collector electrode 21, of current source transistor 20 to the coupled electrodes 14 and 16 of transistors 11 and 12, respectively.

A frequency-determining circuit means including crystal 25 and capacitor 26 couples the control electrode 17 of one of the pair of signal-handling devices 11 to the second electrode 15 (the collector in the illustrated embodiment) of the other signal-handling device 12. This frequency-determining circuit sets the frequency of oscillation of the oscillator circuit substantially at the given frequency. The resulting signal at output terminal 27 is derived at collector electrode 15 of transistor 12 and is of the given frequency of the input reference burst signal and has a phase determined by the phase of the input reference burst signal.

A preferred embodiment of the invention has a resonating means, including inductor 28, capacitor 26, and capacitor 29 coupled between the second of the pair of electrodes, namely collector electrode 15, of transistor 12, and at least one point of fixed reference potential. In the preferred illustrated embodiment, the series circuit including inductor 28, capacitor 26, and capacitor 29 is coupled between terminal 30 at a first reference potential (the supply voltage terminal $V_{cc}$) and a point of a second reference potential 31 different from the first reference potential (ground terminal 31). The resonating LC circuit is proportioned to resonate at the given frequency, whereby the fundamental frequency component of the output signal at terminal 27 is the major component of the output signal. Normally the fundamental component of the frequency is 3.58 mHz.

Crystal 25 couples the control electrode of transistor 11 (base electrode 17) to the collector electrode 15 of transistor 12. In the preferred embodiment, the coupling circuit between these two electrodes includes not only crystal 25 but also capacitor 26 in series with crystal 25.

The basic oscillator of the invention consists of the emitter-coupled pair of transistors 11 and 12 and current source transistor 20 whose collector 21 is connected to line 19 coupling the emitters 14 and 16 of transistors 11 and 12, respectively. The resonant tank circuit including the collector 15 of transistor 12 and crystal 25 are both tuned to resonate at 3.58 mHz. for normal operation. The burst signal impressed on the base 23 of transistor 20 generates the 3.58 mHz. current signal in current source transistor 20. This current wave form is passed by transistor 12 into the resonant tank circuit including the collector 15 of transistor 12. The values of capacitors 26 and 29 are chosen to allow sufficient signal to be fed back to the base 17 of transistor 11 to insure square wave switching between transistors 11 and 12 of the current flowing through the current-conducting electrodes 21 and 22 of current source transistor 20. Resistors 34 and 35 are conventional bias resistors connected to a suitable bias voltage $V_{Bias}$ for biasing transistors 11 and 12, respectively. Inductor 28 combined with capacitors 26 and 29 picks out the fundamental component of the current in the tank circuit and converts it to a voltage across inductor 28 in parallel with resistor 32. If the burst phase at input 10 is not identical to the phase of the signal in the resonant tank circuit, the oscillator will be pulled substantially into phase with the burst phase, during the 8 cycle burst period.

The output signal of the given 3.58 mHz. frequency and the phase determined by the phase of the reference burst signal at input terminal 10 is passed from output terminal 27 to other portions of the television receiver. Normally, the signal is passed to tint control circuitry, although the signal may, if desired, be passed directly to the color demodulator circuitry. In the latter case, the tint control is normally located in the receiver circuitry prior to the input terminal 10 to the oscillator of this invention.

By way of example, and not by way of limitation, the following is a list of component values which may be employed in the circuit illustrated in the drawing, representing a preferred embodiment of the invention:

| Component: | | Value |
|---|---|---|
| Transistor 11 | | SE1001 |
| Transistor 12 | | SE1001 |
| Transistor 20 | | SE1001 |
| Crystal 25 | mHz | 3.58 |
| Capacitor 26 | pf | 100 |
| Capacitor 29 | pf | 470 |
| Resistor 32 | | 3K |
| Resistor 33 | | 100Ω |
| Resistor 34 | | 2K |
| Resistor 35 | | 2K |
| Inductor 28 | μh | 20 |
| $V_{cc}$ | v | 12 |
| $V_{Bias}$ | v | 6 |

It will be understood by one skilled in the art that the specific example illustrated in the drawing and described in the detailed description is merely representative of an operating circuit according to the invention. Many modifications and improvements may be made by one skilled in the art without departing from the spirit and scope of the invention. Therefore the scope of the invention is to be limited only as set forth in the claims which follow.

What is claimed is:

1. An oscillator circuit for generating a signal having a given frequency and a phase determined by the phase of an input reference signal to the oscillator, comprising:
   a pair of solid-state signal-handling devices each having a pair current-conducting electrodes and a control electrode;
   means coupling a first of said pair of current-conducting electrodes of one of said devices to the corresponding first of said current-conducting electrodes of the other device;
   a solid-state signal-handling device connected as a current source having two current-conducting electrodes, one of which is a current output electrode and a control electrode for controlling current output from said source, said control electrode adapted for being coupled to a reference signal having a given substantially constant frequency and phase;
   a means coupling the current output electrode of said current source to the coupled electrodes of said pair of signal-handling devices to couple said reference signal having said substantially constant frequency and phase to said coupled electrodes; and
   a frequency-determining circuit means coupling the control electrode of one of said pair of signal-handling devices to the second of said pair of electrodes of the other of said signal-handling devices for setting the frequency of oscillation of said oscillator circuit substantially at said given frequency, whereby an output signal of said given frequency and phase determined by the phase of said reference signal is derived at said second of said pair of electrodes.

2. The oscillator circuit of claim 1 further characterized by said pair of solid-state signal-handling devices being transistors.

3. The oscillator circuit of claim 2 further characterized by said solid-state signal-handling device connected as current source being a transistor wherein said control electrode is the base electrode.

4. The oscillator circuit of claim 2 further characterized by said coupled electrodes being the emitter electrodes of said transistors.

5. The oscillator circuit of claim 1 further characterized by the addition of a resonating means coupled between said second of said pair of electrodes and at least one point of fixed reference potential, said resonating means proportioned to resonate at a given frequency, whereby the fundamental component of the output signal from said circuit is the major component of the output signal.

6. The oscillator circuit of claim 5 further characterized by said resonating means being a series LC circuit.

7. The oscillator circuit of claim 6 further characterized by the inductance of said LC circuit coupling said second of said pair of electrodes to a point of a first fixed reference potential and said capacitance portion of said LC circuit coupling said second of said pair of electrodes to a point of a second fixed reference potential different from said first fixed reference potential.

8. The oscillator circuit of claim 1 further characterized by said frequency determining circuit means having a means including a crystal coupling said control electrode of one of said pair of signal-handling devices to the second of said pair of electrodes of the other of said signal-handling devices.

9. The oscillator circuit of claim 8 further characterized by said coupling means having a capacitor in series with said crystal.

References Cited

UNITED STATES PATENTS

| | | | |
|---|---|---|---|
| 2,981,899 | 4/1961 | Hahnel | 331—116 |
| 3,040,272 | 6/1962 | Hukee | 331—159 |

JOHN KOMINSKI, *Primary Examiner.*